United States Patent
Jafar Ali et al.

(10) Patent No.: US 10,951,552 B2
(45) Date of Patent: Mar. 16, 2021

(54) GENERATION OF A CHATBOT INTERFACE FOR AN APPLICATION PROGRAMMING INTERFACE

(71) Applicant: INTERNATIONAL BUSINESS MACHINES CORPORATION, Armonk, NY (US)

(72) Inventors: Hisham Jafar Ali, Nottingham (GB); Matthew J. Kempa, Congleton (GB); Aaquib Naved, Oadby (GB); Robert B. Nicholson, Southsea (GB); Vivek R. Shah, Hazlemere (GB); Paul S. M. Thorpe, Hampshire (GB); Syed Akhass Adnan Wasti, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/797,670

(22) Filed: Oct. 30, 2017

(65) Prior Publication Data
US 2019/0132264 A1 May 2, 2019

(51) Int. Cl.
*G06F 9/54* (2006.01)
*G06F 9/44* (2018.01)
(Continued)

(52) U.S. Cl.
CPC .............. *H04L 51/02* (2013.01); *G06F 9/547* (2013.01); *G06F 40/295* (2020.01); *G06F 40/30* (2020.01);
(Continued)

(58) Field of Classification Search
CPC ...... G06F 16/951; G06F 16/254; G06F 9/546; G06F 9/4881; G06F 3/0641;
(Continued)

(56) References Cited

U.S. PATENT DOCUMENTS 7,249,117 B2 * 7/2007 Estes ...................... G06Q 50/22
706/52
7,814,048 B2 * 10/2010 Zhou ................... H04L 12/1831
707/602

(Continued)

OTHER PUBLICATIONS

Harika Nakala, A Chatbot Framework for Yioop, May 22, 2017, [Retrieved on May 22, 2020]. Retrieved from the internet: <URL: http://delivery.acm.org/10.1145/2240000/2232005/p1427-balduzzi.pdf?> 44 pages (1-44) (Year: 2017).*

(Continued)

*Primary Examiner* — Anibal Rivera
(74) *Attorney, Agent, or Firm* — Robert C. Bunker

(57) ABSTRACT

Method and system are provided for generating a chatbot interface for an application programming interface (API) that interacts with networked applications. The method may include: receiving as an input a definition document for an API that interacts with networked applications and parsing the definition document to identify intents and entities and obtain examples of the identified intents and entities. The method may convert the definition document to a chatbot data structure including: extracting the intents and entities and their relationship to objects and fields in the API from the definition document; and training the chatbot data structure with the example intents and entities to generate a conversation specification in the chatbot data structure. The method may then generate a chatbot interface for the API.

16 Claims, 7 Drawing Sheets

(51) Int. Cl.
*G06F 11/20* (2006.01)
*H04L 12/58* (2006.01)
*G06F 40/30* (2020.01)
*G06F 40/35* (2020.01)
*G06F 40/56* (2020.01)
*G06F 40/295* (2020.01)
*G06F 9/48* (2006.01)
*G06F 40/123* (2020.01)

(52) U.S. Cl.
CPC .............. *G06F 40/35* (2020.01); *G06F 40/56* (2020.01); *G06F 9/4881* (2013.01); *G06F 40/123* (2020.01); *H04L 51/046* (2013.01)

(58) Field of Classification Search
CPC .... G06F 3/0608; G06F 3/0631; G06F 3/0619; G06F 3/065; G06F 40/35; G06F 40/56; G06F 40/295; G06F 40/30; G06F 40/123; G06F 40/166; G06F 9/547; G06F 9/5011; G06F 9/5077; G06F 11/0793; G10L 15/22; H04L 51/02; H04L 51/046
See application file for complete search history.

(56) References Cited

U.S. PATENT DOCUMENTS

| | | | |
|---|---|---|---|
| 9,043,407 B1* | 5/2015 | Gaulke | H04L 51/046 709/206 |
| 10,025,567 B2* | 7/2018 | Balasubramanian | H04L 51/02 |
| 10,303,773 B2 | 5/2019 | Curtis et al. | |
| 10,455,378 B2* | 10/2019 | Rakovitsky | H04W 4/14 |
| 10,565,634 B2 | 2/2020 | Talmor et al. | |
| 2008/0147406 A1* | 6/2008 | Da Palma | G10L 15/22 704/260 |
| 2008/0147407 A1* | 6/2008 | Da Palma | G10L 15/22 704/260 |
| 2008/0147408 A1* | 6/2008 | Da Palma | G10L 15/22 704/270.1 |
| 2009/0100160 A1* | 4/2009 | Bowerman | G06F 15/173 709/223 |
| 2012/0041903 A1* | 2/2012 | Beilby | H04L 51/02 706/11 |
| 2012/0260263 A1* | 10/2012 | Edoja | G06F 16/958 719/313 |
| 2012/0290412 A1* | 11/2012 | Marovets | G06Q 30/02 705/14.73 |
| 2014/0122083 A1* | 5/2014 | Xiaojiang | H04L 51/02 704/270.1 |
| 2016/0092522 A1* | 3/2016 | Harden | G06F 16/9535 707/602 |
| 2016/0094490 A1* | 3/2016 | Li | H04L 51/02 709/206 |
| 2016/0094507 A1* | 3/2016 | Li | G06F 16/254 709/206 |
| 2016/0352658 A1 | 12/2016 | Capper et al. | |
| 2017/0180284 A1* | 6/2017 | Smullen | H04L 51/046 |
| 2017/0228367 A1 | 8/2017 | Pasupalak et al. | |
| 2018/0107461 A1* | 4/2018 | Balasubramanian | H04L 51/02 |
| 2018/0212904 A1* | 7/2018 | Smullen | H04L 51/04 |
| 2018/0247648 A1* | 8/2018 | Nadimpalli | G06N 5/04 |
| 2018/0331979 A1* | 11/2018 | Rakovitsky | H04L 51/046 |
| 2018/0332447 A1* | 11/2018 | Rakovitsky | G06F 11/3438 |
| 2018/0356989 A1* | 12/2018 | Meister | G06F 11/2064 |
| 2019/0042407 A1* | 2/2019 | Gao | G06F 12/0253 |
| 2019/0065093 A1* | 2/2019 | Karr | G06F 3/061 |
| 2019/0065788 A1* | 2/2019 | Vijayasankar | G06F 21/78 |
| 2019/0073152 A1* | 3/2019 | Nagle | H04L 9/0894 |
| 2019/0103111 A1* | 4/2019 | Tiwari | G06F 16/3334 |
| 2019/0121673 A1* | 4/2019 | Gold | G06F 3/0608 |
| 2019/0121889 A1* | 4/2019 | Gold | G06F 16/24534 |
| 2019/0124020 A1* | 4/2019 | Bobbarjung | G06Q 20/123 |
| 2019/0129818 A1* | 5/2019 | Kannan | G06F 11/1084 |

OTHER PUBLICATIONS

Botkit, "Building Blocks for Building Bots," Botkit, p. 1-4, Xoxco Inc., https://www.botkit.ai/, Accessed on Oct. 27, 2017.
IBM Watson, "Conversation—API Reference," IBM Watson Developer Cloud, 113 pages, https://www.ibm.com/watson/developercloud/conversation/api/v1/, Accessed on Oct. 27, 2017.
Loffe, "Chatbot Integration with Dynamics 365," BOTccelerator Blog, Feb. 9, 2017, p. 1-7, http://www.botccelerator.com/blog/2017/2/8/chatbot-integration-with-dynamics-365, Accessed on Oct. 27, 2017.
Mell et al., "The NIST Definition of Cloud Computing," National Institute of Standards and Technology, Sep. 2011, p. 1-3, Special Publication 800-145.
Pandorabots, "Build a Chatbot for," Pandorabots, p. 1-6, https://pandorabots.com/, Accessed on Oct. 27, 2017.
Patil et al., "Comparative Study of Cloud Platforms to Develop a Chatbot," International Journal of Engineering & Technology, 2017, p. 57-61, vol. 6, No. 3.
Workato, "Workbot for Slack," Workbot by Workato, p. 1-10, https://www.workato.com/workbot-slack, Accessed on Oct. 27, 2017.

* cited by examiner

GENERATION OF A CHATBOT INTERFACE FOR AN APPLICATION PROGRAMMING INTERFACE

BACKGROUND

The present invention relates to chatbot interfaces, and more specifically, to generation of a chatbot interface for an application programming interface that interacts with networked applications.

A chatbot (also known as a talkbot, chatterbot, Bot, IM bot, interactive agent, or Artificial Conversational Entity) is a computer program which conducts a conversation via auditory or textual methods. Chatbots are typically used in dialog systems for various practical purposes including customer service or information acquisition. Some chatbots use sophisticated natural language processing systems.

Chatbot interface technology is also well known. Examples include Watson Conversation (Watson is a trademark of International Business Machines Corporation) and Amazon Alexa (Amazon and Alexa are trademarks of Amazon Technologies, Inc.).

Watson Conversation API adds a natural language interface to an application to automate interactions with end users. Common applications include virtual agents and chatbots that can integrate and communicate on any channel or device.

In computer programming, an application programming interface (API) is a set of subroutine definitions, protocols, and tools for building application software. In general terms, it is a set of clearly defined methods of communication between various software components. A good API makes it easier to develop a computer program by providing all the building blocks, which are then put together by the programmer. An API may interact with networked applications in a web-based system, cloud based system, or other system which interacts with one or more remote applications.

Integration tools such as IBM's App Connect (IBM and App Connect are trademarks of International Business Machines Corporation) provide an easy way for users to automate tasks, which require interactions with Software as a Service (SaaS) applications. Integration Platform as a Service (IPaaS) software can generate integration APIs.

APIs that interact with networked applications, in particular integration APIs, are invoked through API calls that are very difficult for non-technical users to invoke. Therefore, these APIs do not get used by non-technical users, unless a technical user provides them with a user-friendly interface to call the APIs.

SUMMARY

According to an aspect of the present invention there is provided a computer-implemented method for generating a chatbot interface for an application programming interface (API) that interacts with networked applications, comprising: receiving as an input a definition document for an API that interacts with networked applications; parsing the definition document to identify intents and entities and obtain examples of the identified intents and entities; converting the definition document to a chatbot data structure including: extracting the intents and entities and their relationship to objects and fields in the API from the definition document; training the chatbot data structure with the example intents and entities to generate a conversation specification in the chatbot data structure; and generating a chatbot interface for the API.

According to another aspect of the present invention there is provided a system for generating a chatbot interface for an application programming interface (API) that interacts with networked applications, comprising: a processor and a memory configured to provide computer program instructions to the processor to execute the function of the components; an API definition receiving component for receiving as an input a definition document for an API that interacts with networked applications; a parsing component for parsing the definition document to identify intents and entities and obtain examples of the identified intents and entities; a converting component for converting the definition document to a chatbot data structure including: an extracting component for extracting the intents and entities and their relationship to objects and fields in the API from the definition document; a training component for training the chatbot data structure with the example intents and entities to generate a conversation specification in the chatbot data structure; and a chatbot interface providing component for generating a chatbot interface for the API.

According to a further aspect of the present invention there is provided a computer program product for generating a chatbot interface for an application programming interface (API) that interacts with networked applications, the computer program product comprising a computer readable storage medium having program instructions embodied therewith, the program instructions executable by a processor to cause the processor to: receive as an input a definition document for an API that interacts with networked applications; parse the definition document to identify intents and entities and obtain examples of the identified intents and entities; convert the definition document to a chatbot data structure including: extract the intents and entities and their relationship to objects and fields in the API from the definition document; train the chatbot data structure with the example intents and entities to generate a conversation specification in the chatbot data structure; and generate a chatbot interface for the API.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

Figure 1:
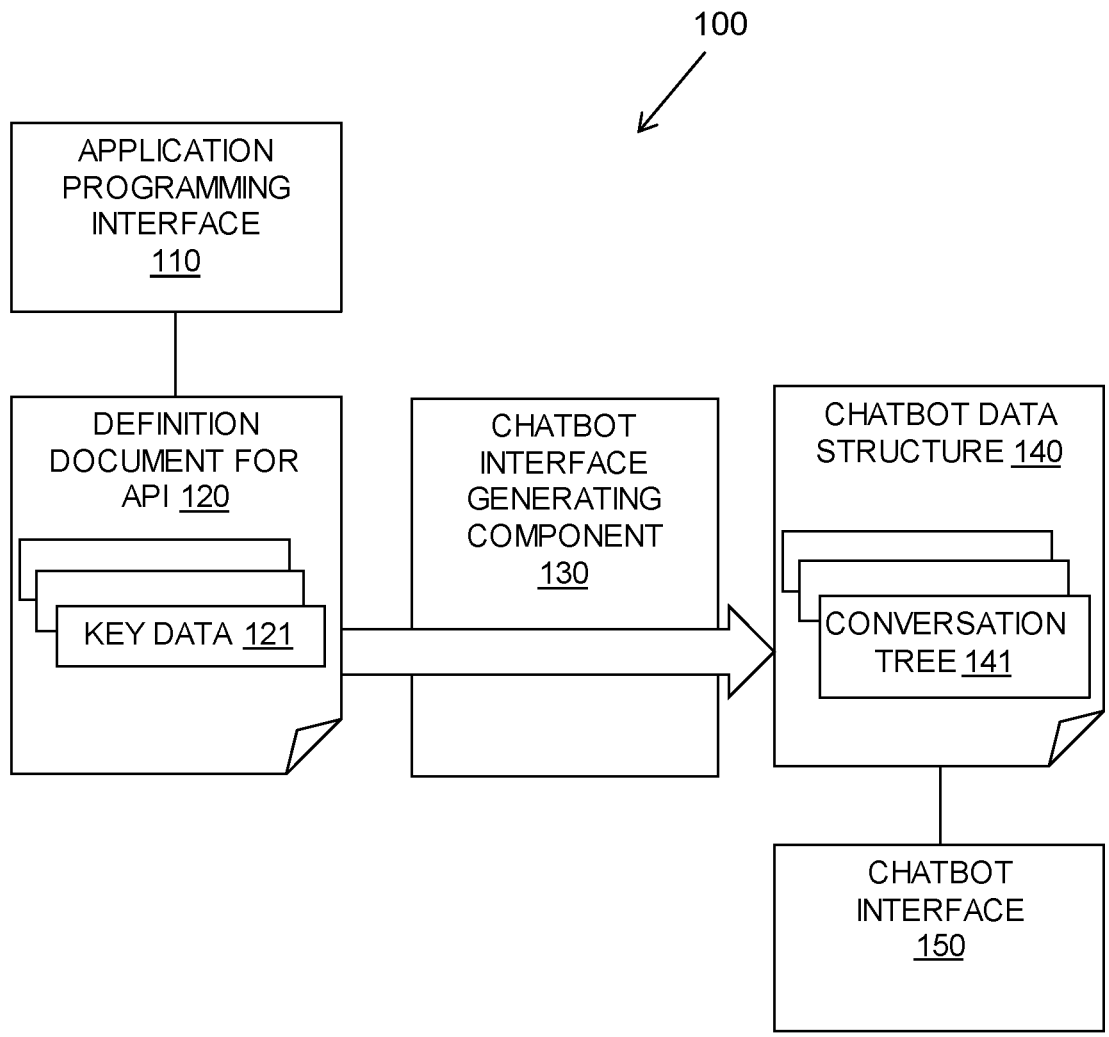
FIG. 1 is a schematic diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The described method and system provide an ability to automatically generate a chatbot interface for an application programming interface (API) that interacts with networked applications in order to enable a user to interact with the API using the chatbot interface. The described method and system provide a tool that can understand the intents and entities from the API and build the conversation automatically.

In one embodiment, the API that interacts with networked applications may be an integration API for a customizable integration flow. Integration tools provide a way for users to automate tasks, which require interactions with Software as a Service (SaaS) applications. Integration Platform as a Service (IPaaS) software can generate integration APIs. Generation of a chatbot interface onto a fully customizable integration flow enables a user to build tailored integrations and interact with them using a chat interface. This provides a natural language interface with which the user can converse, allowing a non-technical user to interact with an integration by calling the API.

In another embodiment, the approach may be used with another form of API that interacts with networked applications which is not limited to using an integration flow. The APIs may interact with one or more networked applications, which may be accessed on-premise, via a network or on cloud.

The form of APIs may include Representational State Transfer (RESTful) APIs which may be described using a variety of description styles including OpenAPI file (Swagger file), RESTful API Modeling Language (RAML), Web Application Description Language (WADL), Simple Object Access Protocol (SOAP) APIs described using Web Services Description Language (WSDL). REST is an architecture style for designing networked applications that relies on a stateless, client-server, cacheable communications protocol such as a hypertext transfer protocol (HTTP).

An API that interacts with networked application uses an architectural approach that revolves around providing programmable interfaces to a set of services to different applications serving different types of consumers. When used in the context of web development, a web API is typically defined as a set of Hypertext Transfer Protocol (HTTP) request messages, along with a definition of the structure of response messages, which is usually in an Extensible Markup Language (XML) or JavaScript Object Notation (JSON) format.

The method takes the API that interacts with networked applications and for which a definition document is available and automatically generates a chatbot interface for it. In Watson Conversation's nomenclature, this means creating the "conversation" from them. The chatbot would be able to implement the conversations that are created and call the API endpoint through conversation. In this way, the chatbot conversation understands the objects in the interface and the fields of those objects.

Referring to FIG. 1, a schematic diagram shows an example embodiment of the described system 100.

A chatbot interface generating component 130 may be provided as an interface to associate a API 110 that interacts with networked applications with a chatbot interface 150. The chatbot interface generating component 130 may be connected, so that the chatbot interface generating component 130 may load up existing APIs 110 or create new APIs.

A chatbot interface 150 may have a set of added or created APIs 110 associated to it by a user for which the chatbot is to be provided.

The API 110 may be provided with a definition document 120, for example, an OpenAPI file. The OpenAPI file may be represented in a Java Script Object Notation (JSON) (Java is a trademark of Oracle Corporation) format, or other suitable format.

The OpenAPI Specification (OAS) defines a standard, language-agnostic interface to RESTful APIs which allows both humans and computers to discover and understand the capabilities of the service without access to source code, documentation, or through network traffic inspection. When properly defined, a consumer can understand and interact with the remote service with a minimal amount of implementation logic.

The implementation of the described chatbot interface leverages the ability to create an API that interacts with networked applications and that is exposed as a Representational State Transfer (RESTful) API.

Key data 121 may be extracted from the definition document 120 and used by the chatbot interface generating component 130 to create a conversation tree 141 in a chatbot data structure 140. This may then be used to generate the chatbot interface 150 which may then be deployed to a chatbot platform. The key data 121 may relate to intents and entities and their relationship to the API objects and fields.

Chatbot interface technology is well known and a known chatbot interface API, for example, Watson Conversation API, may be used to add a natural language interface to an application to automate interactions with end users. However, building a conversation with an API that interacts with networked applications is more complex and functionality is described to extend a chatbot interface API to accommodate this.

The key for a chatbot to understand humans is its ability to understand the intentions of humans and extraction of relevant information from that intention and of course relevant action against that information. NLP (Natural language processing) is used for extracting the intention of text and relevant information from text. A chatbot platform includes an NLP service that can be trained, a software development kit to support and handle conversations and their metadata, and a platform to host the chatbot code.

In chatbot interface APIs a workspace may be provided as a container for artifacts that define the conversation flow. A dialog is a flow of conversation in a logic tree with each node of the tree has a condition that triggers it based on user input.

Intents are purposes or goals expressed in a customer's input, such as answering a question or processing a bill payment. By recognizing the intent expressed in a customer's input, the conversation service can choose the correct dialog flow for responding to it. Entities represent a class of object or a data type that is relevant to a user's purpose and may be provided as metadata to the intents. By recognizing the entities that are mentioned in the user's input, the conversation service can choose the specific actions to take to fulfill an intent. Examples may be provided of user inputs to train the service to identify the intents and entities.

Figure 2:
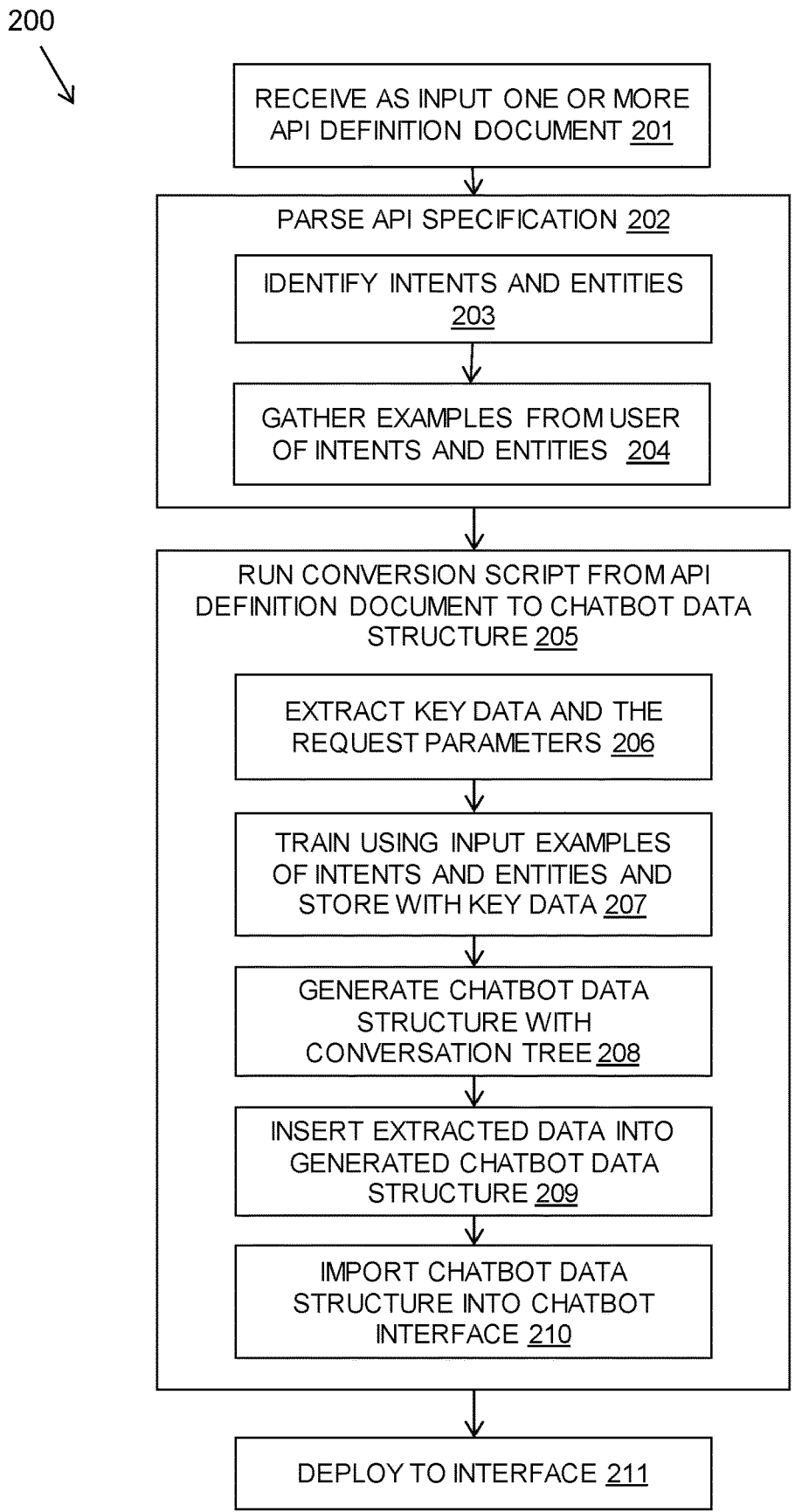
FIG. 2 is flow diagram of an example embodiment of a method in accordance with the present invention.

Referring to FIG. 2, a flow diagram 200 shows an example embodiment of the described method as carried out by a chatbot interface generating component 130. The method may be carried out for multiple APIs that interface with networked applications for which the chatbot interface is to be used.

One or more APIs may be received 201 as an input for a particular chatbot interface to be generated, each API having a definition document.

For each API, the API specification is parsed 202 to interpret the definition document and the user is asked for input. For each API, the intents and entities are identified 203 from the API in an automated step. In the case of APIs that conform to a particular format, it is possible to deduce the intents and entities. For example, where the API is known to follow the common scheme of CRUD (Create, Read, Update, Delete) Operations in REST, then the intents are Create, Read, Update, Delete and the entity is given by the path. In another embodiment using OpenAPI, tags may be used to categorize operations and intents and entities may be defined in tags.

Examples may then be gathered 204 by asking the user to provide examples for the intents and entities.

Intents and entities and their examples may be gathered on how to interact with the chatbot to trigger the APIs, as well as how to extract the key pieces of input information (entities). These examples are gathered before the conversion specification is generated. When the conversion script is run, the examples are added to the relevant parts of the data structure for the chatbot software.

In an example, the API may be able to retrieve, create, update, and delete "contacts" and a contact may have name, phone, and ZIP. Then the intents may include "create contact", "delete contact", etc. The entities may include "contact", "name" "phone", "ZIP". Example entities for a name might be "john smith", "james white", etc. Example interactions might be, "update john smith's phone number", "delete james white".

A conversion script is run 205, which converts the API data structure of the definition document to a chatbot software data structure.

This includes extracting 206 the intents and entities from the API data structure and their relationships to objects and fields in the API, such as the API Uniform Resource Locator (URL), names of the applications it interacts with, and the details of each piece of information the user may input into the API (the request parameters). Intents may be extracted from paths and entities from parameters in the description document. In some embodiments, parameters may be described by definitions in a schema and the method may look up the entities from the schema.

This conversion also includes training 207 with the user input examples for each intent and entity to generate 208 a conversation specification in the chatbot data structure including storing the examples.

The conversation specification may be a chatbot conversation tree generated 208 in a chatbot software data structure using the extracted data. The chatbot software data structures may be, for example, Java Script Object Notation (JSON) (Java is a trademark of Oracle Corporation) objects and can be generated by the conversion script, without needing a user interface tooling. An example is the API documentation for Watson Conversation.

The extracted data is inserted 209 into the generated data structure, which is then imported 210 into the chatbot interface via an API call. This would generate a chatbot interface with a conversation tree based on the input APIs.

The chatbot interface may be deployed 211 to a required chatbot platform. This can be done through known libraries.

Figure 3:
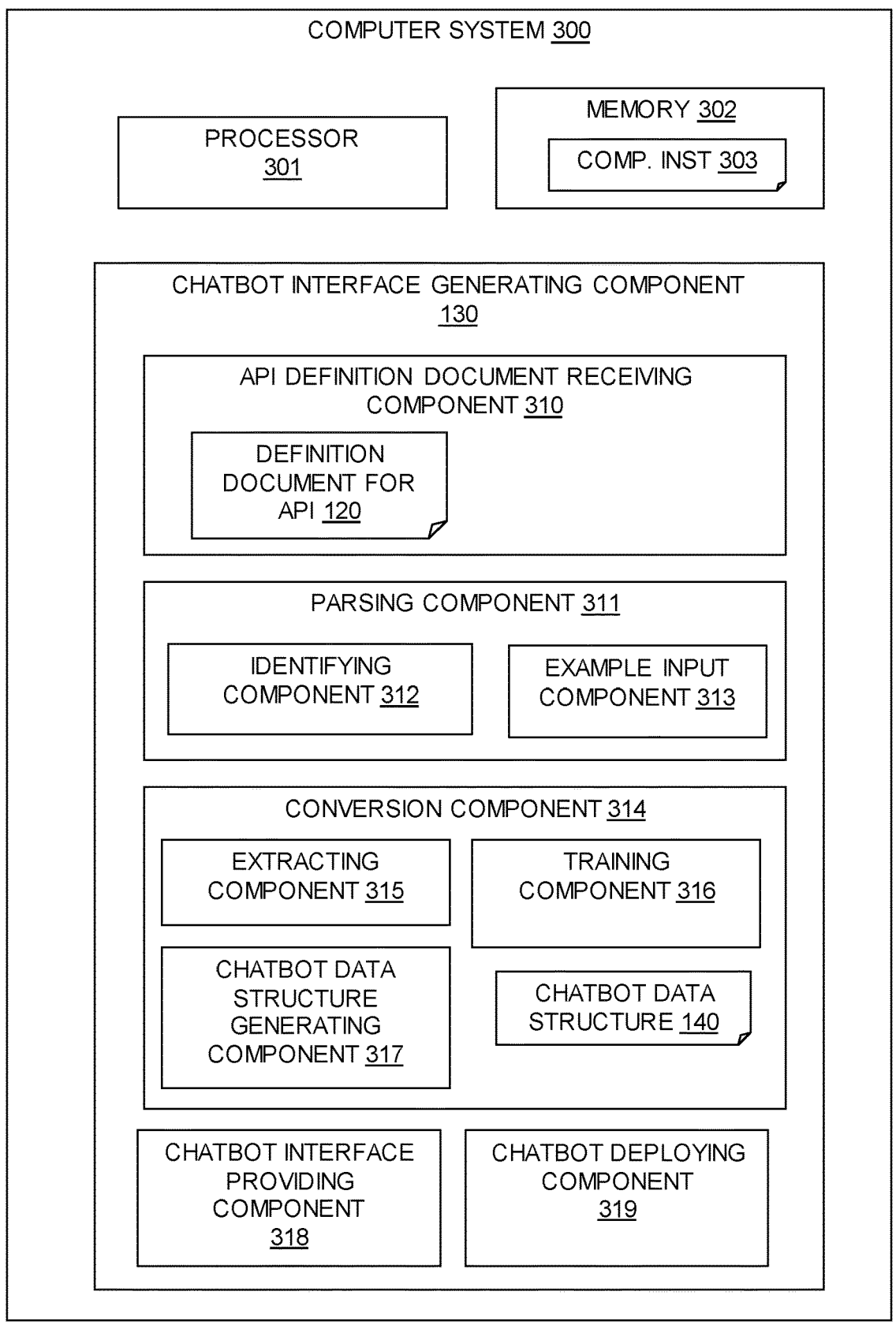
FIG. 3 is block diagram of an example embodiment of a system in accordance with the present invention.

Referring to FIG. 3, an example embodiment of a chatbot interface generating component 130 provided by a computer system 300 is described.

The computer system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components. The computer system 300 may be, for example, an on-premise, networked, or cloud computer system providing the functionality of the generation of a chatbot interface for an API.

The chatbot interface generating component 130 may include an API definition receiving component 310 for receiving as an input a definition document 120 for an API that interacts with networked applications. The API definition receiving component 310 may receive definition documents 120 for multiple network APIs for generation of a chatbot interface for the multiple network APIs. The definition documents 120 may be accessed from a remote location in the API tool.

The chatbot interface generating component 130 may include a parsing component 311 for parsing or interpreting the definition document 120 to identify intents and entities and obtain examples of the identified intents and entities from the definition document 120. The parsing component 311 may include an identifying component 312 for automatically identifying intents and entities and an example input component 313 for receiving user inputs of examples of the identified intents and entities.

The chatbot interface generating component 130 may include a converting component 314 for converting the definition document to a chatbot data structure 140. The converting component 314 may run a conversion script and may include an extracting component 315 for extracting the intents and entities and their relationship to objects and fields in the API from the definition document 120 and a training component 316 for training the chatbot data structure 140 with the example intents and entities to generate a conversation specification in the chatbot data structure 140.

The chatbot interface generating component 130 may include a chatbot data structure generating component 317 for generating a conversation specification in the chatbot data structure 140 using a Natural Language Processing service. The conversation specification may be in the form of a conversation tree storing the extracted intents and entities and their relationship to objects and fields in the API.

The chatbot interface generating component 130 may include a chatbot interface providing component 318 for generating a chatbot interface for the network API and a deploying component 319 for deploying the chatbot interface to a user selected chatbot platform.

Figure 4:
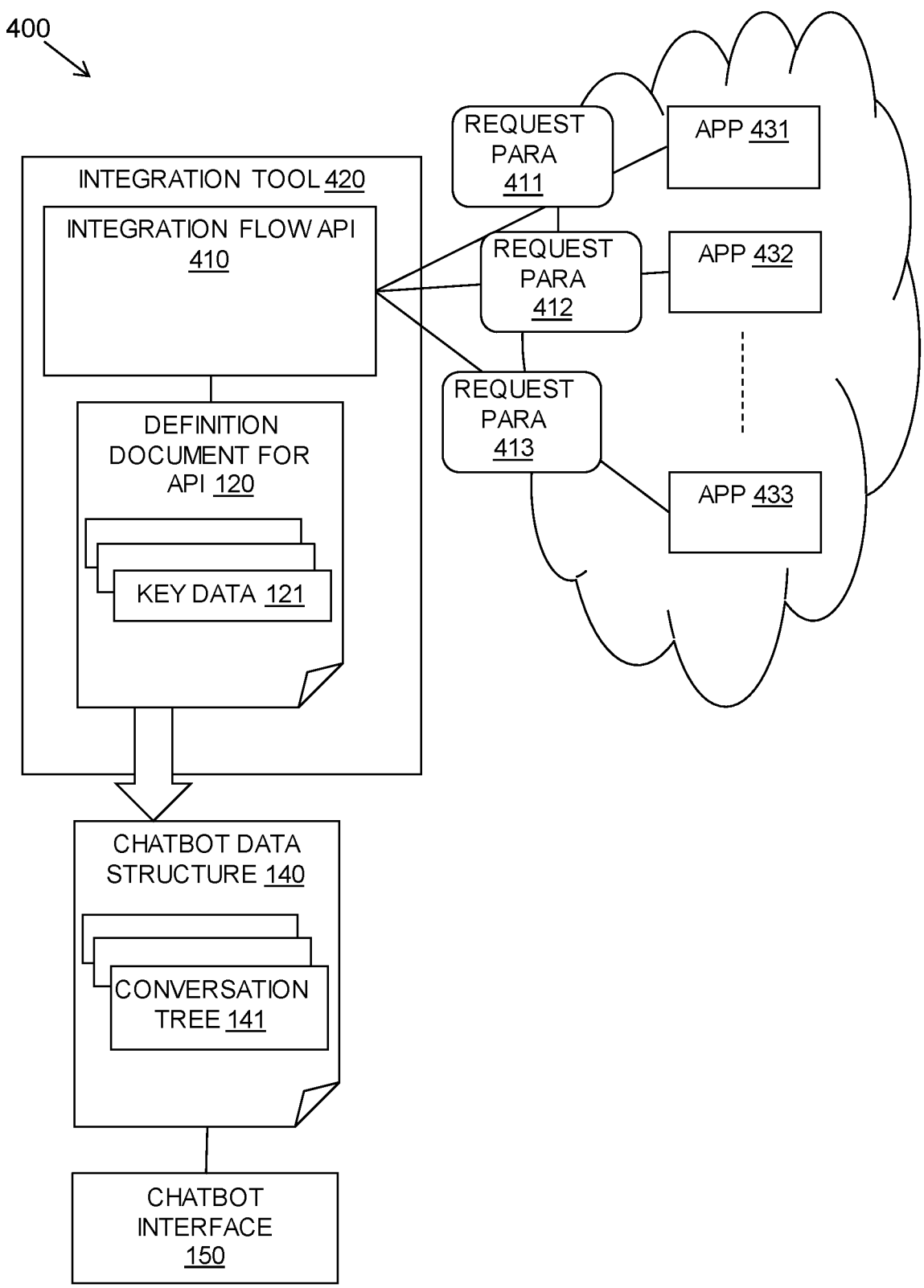
FIG. 4 is a block diagram of an example implementation of the present invention.

Referring to FIG. 4, a schematic diagram 400 shows an example embodiment in the context of an integration flow API 410. The ability to add a chat interface onto a fully customizable integration flow is described. This enables a user to build tailored integrations and interact with them using a chat interface.

A chatbot interface 150 may be created for an integration tool 420. Integration tools 420 such as IBM's App Connect provide an easy way for users to automate tasks that require interactions with SaaS applications 431-433, for example, such as sales and marketing automation software. Integration tools 420 can be used to build automations for tasks, such as copy the contract for "Fred Bloggs" into a record in marketing software. A chatbot interface 150 generated as described herein can be used to drive these integrations. By providing a chat interface 150 to these integration APIs 410, non-technical users may interact with these integration flows in a simple and convenient way.

An integration flow API 410 may include interaction with networked or cloud based applications 431-433 using request parameters 411-413. A definition document 120 for the API may be provided from which key data 121 may be extracted in the form of intents and entities and their relationship to the API objects and fields such as the API URL, the applications 431-433 and the request parameters 411-413 may be extracted.

The implementation of the described chatbot interface leverages the ability to create an integration flow that is exposed as a Representational State Transfer (RESTful) API.

The definition document 120 is converted by the described method and system to a chatbot data structure 140 including a conversation tree 141 relating to the key data 121. The chatbot data structure 140 is used to provide a chatbot interface 150 for a chatbot platform.

The described method and system automatically generates a chatbot interface 150 that can deploy to any application/interface platform of the end user's choosing and is not limited to working within one application. For example, applications to which the chatbot interface may be deployed include Slack (Slack is a trademark of Slack Technologies, Inc.), Facebook Messenger (Facebook is a trademark of Facebook, Inc.) or Quip (Quip is a trademark of Quip, a Salesforce company).

The described method of generating a chatbot interface 150 grants users the right not to know where their data is stored or how their applications work, which is highly advantageous in terms of increased productivity by end users.

The described method enables users to invoke a customized integration flow 410 that interacts with multiple applications 431-433.

An example is provided of an OpenAPI v2 document (formerly known as Swagger) using a well known PetStore sample. Some of the endpoints have been removed, but leaving the ones appropriate to "Users". From this document, the method may discover intents such as "delete user" from the paths and entities such as "name" from its parameters. For intents such as "create user" the parameter is described by a schema, so the entities such as "firstName", "lastName", "email" would be read from the definitions section. The example intents and entities are underlined in the extract below.

```
    swagger: '2.0'
info:
  description: 'This is a sample server Petstore server. You can find out
more about Swagger at [http://swagger.io](http://swagger.io) or on
[irc.freenode.net, #swagger](http://swagger.io/irc/). For this sample,
you can use the api key `special-key` to test the
authorization filters.'
  version: 1.0.0
  title: Swagger Petstore
  termsOfService: 'http://swagger.io/terms/'
  contact:
    email: apiteam@swagger.io
  license:
    name: Apache 2.0
    url: 'http://www.apache.org/licenses/LICENSE-2.0.html'
host: petstore.swagger.io
basePath: /v2
tags:
  - name: pet
    description: Everything about your Pets
    externalDocs:
      description: Find out more
      url: 'http://swagger.io'
  - name: store
    description: Access to Petstore orders
  - name: user
    description: Operations about user
    externalDocs:
      description: Find out more about our store
      url: 'http://swagger.io'
schemes:
  - http
paths:
  /user:
    post:
      tags:
        - user
      summary: Create user
      description: This can only be done by the logged in user.
      operationId: createUser
      produces:
        - application/xml
        - application/json
      parameters:
        - in: body
          name: body
          description: Created user object
          required: true
          schema:
            $ref: '#/definitions/User'
      responses:
        default:
          description: successful operation
....
      summary: Delete user
      description: This can only be done by the logged in user.
      operationId: deleteUser
      produces:
        - application/xml
        - application/json
      parameters:
        - name: username
          in: path
          description: The name that needs to be deleted
          required: true
          type: string
      responses:
        '400':
          description: Invalid username supplied
        '404':
          description: User not found
```

```
definitions:
  User:
    type: object
    properties:
      id:
        type: integer
        format: int64
      username:
        type: string
      firstName:
        type: string
      lastName:
        type: string
      email:
        type: string
      password:
        type: string
      phone:
        type: string
      userStatus:
        type: integer
        format: int32
        description: User Status
    xml:
      name: User
externalDocs:
  description: Find out more about Swagger
  url: 'http://swagger.io'
```

The key data is inserted into a generated chatbot data structure, for example, a generated Watson Conversation JSON. Other conversation technologies may also be used. This demonstrates how key data may be transferred from an API to a chatbot interface software conversation.

The following shows the essence of example nodes in which an intent of "Create User" is created with examples of "Create a user", "Add a user", "New user". Entities may be "firstName", "lastName", "email", "phone".

```
{
  "name": "PetStore",
  "intents": [
    {
      "intent": "createUser",
      "examples": [
        {
          "text": "Create a user"
        },
        {
          "text": "Add a user"
        },
        {
          "text": "New user"
        }
      ]
    }
  ],
  "entities": [
    {
      "entity": "firstName"
    },
    {
      "entity": "lastName"
    },
    {
      "entity": "email"
    },
    {
      "entity": "phone"
    }
  ],
  "dialog_nodes": [
    {
      "type": "frame",
      "title": "createUser",
      "output": {
        "text": {
          "values": [
            "Thank you. I'll get that done for you!"
          ]
        },
        "action": "http://petstore.swagger.io/v2/user",
        "parameters": [
          {
            "param": "firstName",
            "value": "$firstName"
          },
          {
            "param": "lastName",
            "value": "$lastName"
          },
          {
            "param": "phone",
            "value": "$phone"
          },
          {
            "param": "email",
            "value": "$email"
          }
        ]
      },
      "conditions": "#createUser",
      "previous_sibling": "Welcome"
    },
    {
      "title": "Welcome",
      "output": {
        "text": {
          "values": [
            "Hello. How can I help you?"
          ],
          "selection_policy": "sequential"
        }
      }
    }
  ]
}
```

Dialog nodes may be provided using the intents and entities that are identified in the user's input, plus context from the API, to interact with the user and ultimately provide a useful response.

Figure 5:
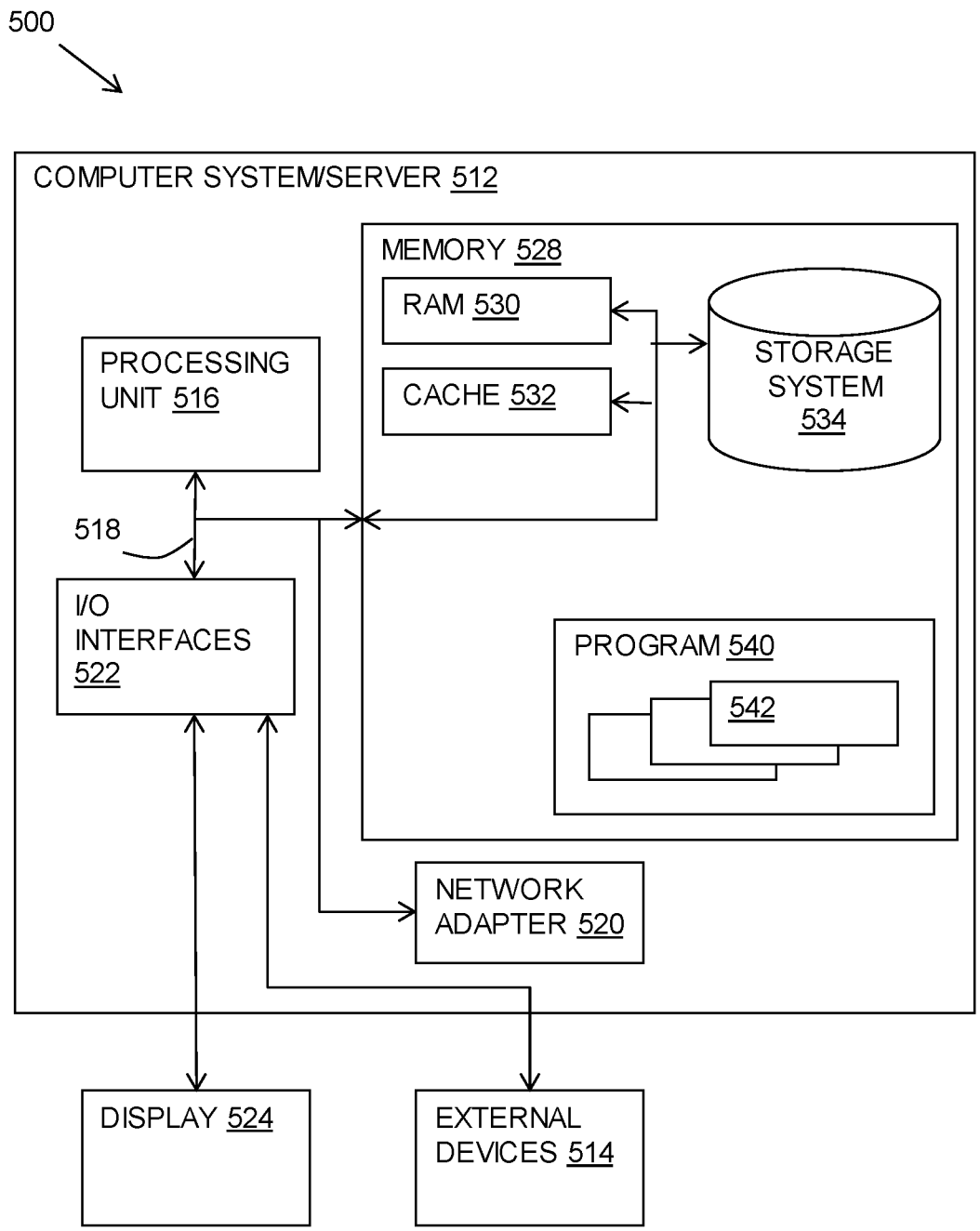
FIG. 5 is a block diagram of an embodiment of a computer system or cloud server in which the present invention may be implemented.

Referring now to FIG. 5, a schematic of an example of a system 500 in the form of a computer system or server is shown.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
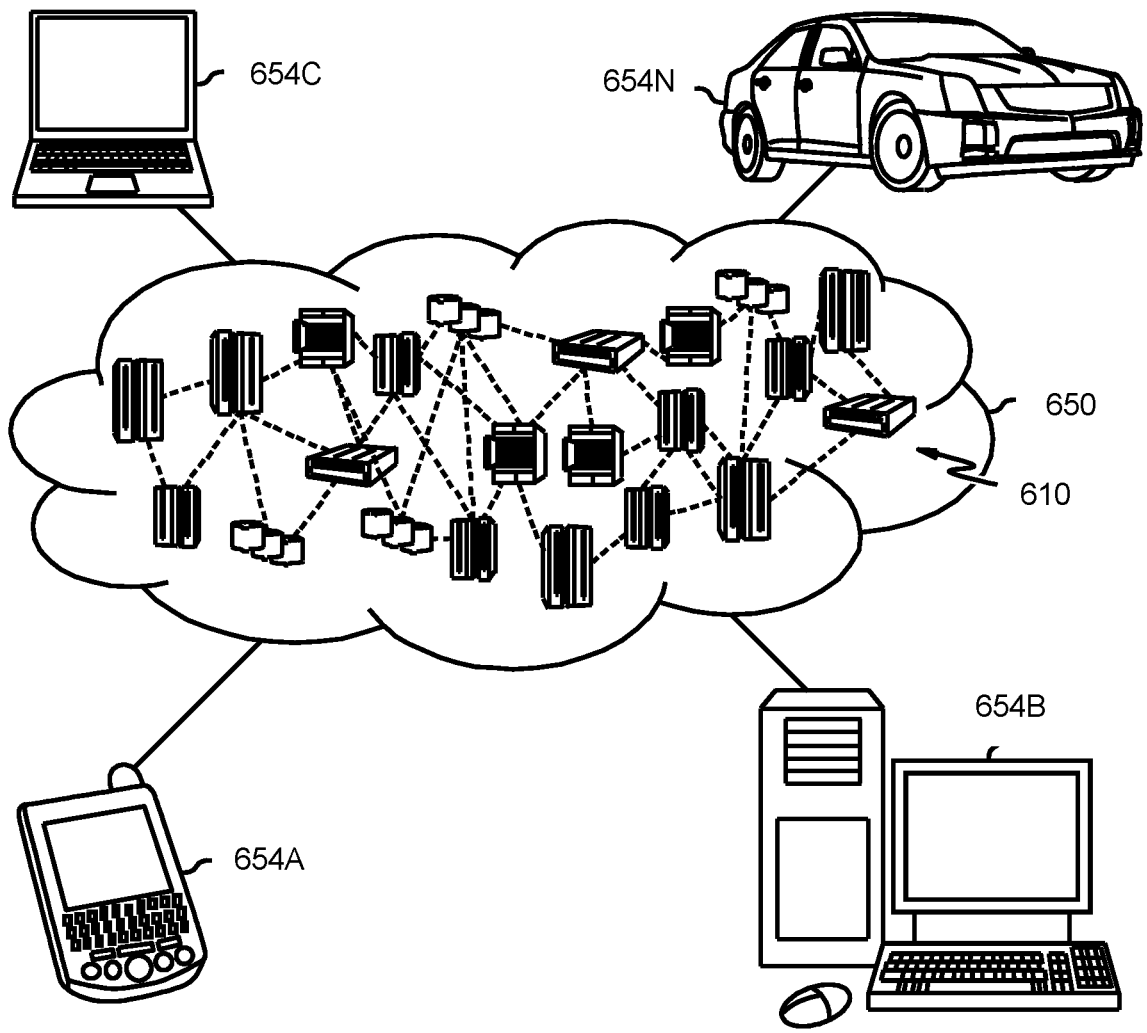
FIG. 6 is a schematic diagram of a cloud computing environment in which the present invention may be implemented.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
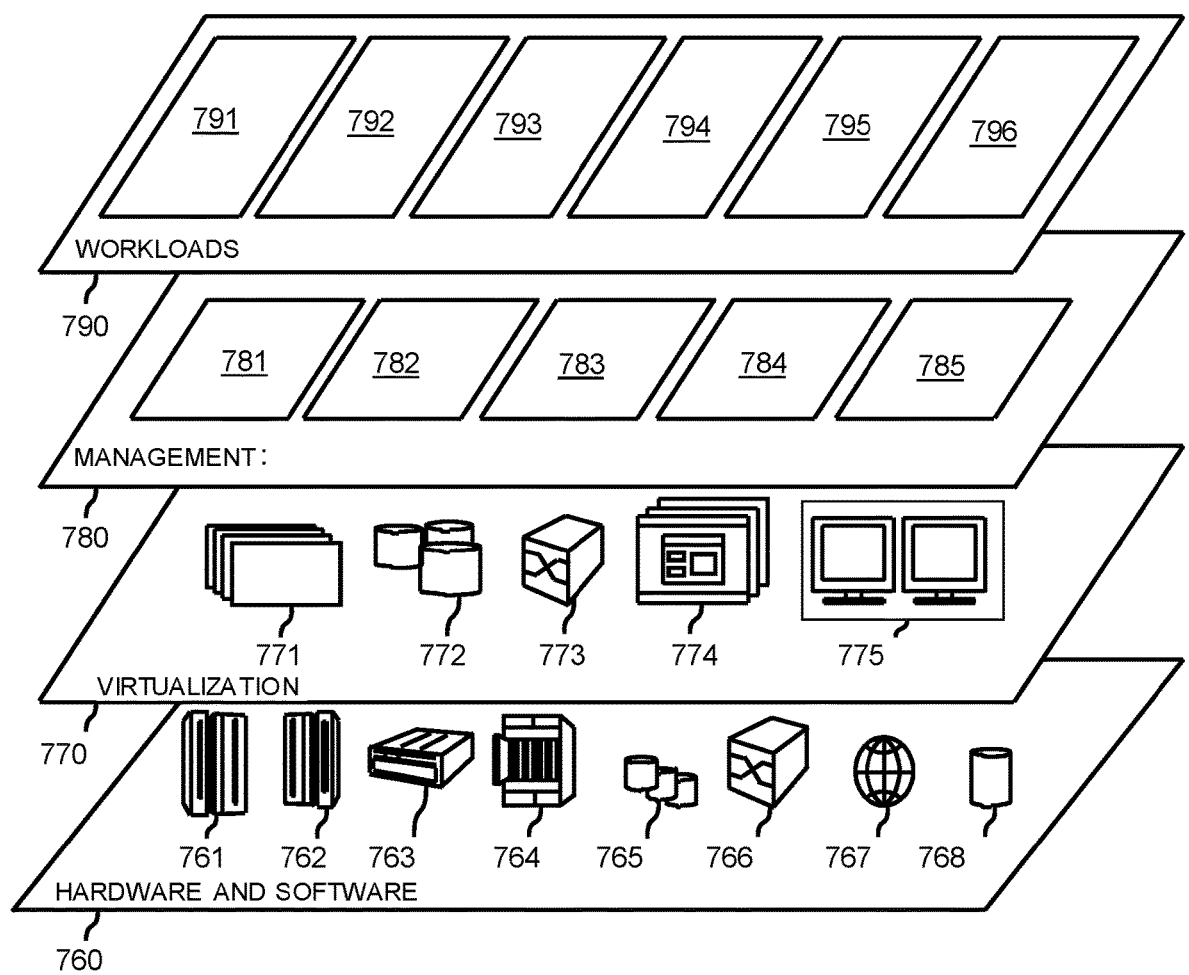
FIG. 7 is a diagram of abstraction model layers of a cloud computing environment in which the present invention may be implemented.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and chatbot interface generation 796.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a chatbot interface for an application programming interface (API) that interacts with networked applications, comprising:
  receiving as an input a definition document for the API that interacts with cloud-based networked applications;
  parsing the definition document to identify intents and entities and obtain examples of the identified intents and entities;
  converting the definition document to a chatbot data structure including:
    extracting the intents and entities and their relationship to objects and fields in the API from the definition document, wherein the objects and fields in the API include (i) API Uniform Resource Locators, (ii) names of the cloud-based networked applications the API interacts with, and (iii) request parameters for user input information;
    training the chatbot data structure with the example intents and entities to generate a conversation specification in the chatbot data structure, wherein the conversation specification is a conversation tree storing the extracted intents and entities and their relationship to the objects and fields in the API; and
    generating a chatbot interface for the API.

2. The method as claimed in claim 1, wherein multiple APIs that interact with networked application are input for generation of a chatbot interface for the multiple APIs.

3. The method as claimed in claim 1, wherein parsing the definition document includes automatically identifying intents and entities and receiving user inputs of examples of the identified intents and entities.

4. The method as claimed in claim 1, wherein extracting the intents and entities includes extracting intents from paths and entities from parameters in the description document.

5. The method as claimed in claim 4, including looking up entities from definitions of parameters in an associated schema.

6. The method as claimed in claim 1, including deploying the chatbot interface to a user selected chatbot platform.

7. The method as claimed in claim 1, wherein the API is a Representational State Transfer (RESTful) API and the description document is selected from the group consisting of: OpenAPI file (Swagger file), RESTful API Modeling Language (RAML), Web Application Description Language (WADL), and Simple Object Access Protocol (SOAP) APIs described using Web Services Description Language (WSDL).

8. A system for generating a chatbot interface for an application programming interface (API) that interacts with networked applications, comprising:
  a processor and a memory configured to provide computer program instructions to the processor to execute the function of the components;
  an API definition receiving component for receiving as an input a definition document for the API that interacts with cloud-based networked applications;
  a parsing component for parsing the definition document to identify intents and entities and obtain examples of the identified intents and entities;
  a converting component for converting the definition document to a chatbot data structure including:
    an extracting component for extracting the intents and entities and their relationship to objects and fields in the API from the definition document, wherein the objects and fields in the API include (i) API Uniform Resource Locators, (ii) names of the cloud-based networked applications the API interacts with, and (iii) request parameters for user input information;
    a training component for training the chatbot data structure with the example intents and entities to generate a conversation specification in the chatbot data structure, wherein the conversation specification is a conversation tree storing the extracted intents and entities and their relationship to the objects and fields in the API; and
    a chatbot interface providing component for generating a chatbot interface for the API.

9. The system as claimed in claim 8, wherein the API definition receiving component receive document definitions for multiple APIs that interact with networked applications for generation of a chatbot interface for the multiple APIs.

10. The system as claimed in claim 8, wherein the parsing component automatically identifies intents and entities and receives user inputs of examples of the identified intents and entities.

11. The system as claimed in claim 8, wherein the chatbot data structure generating component uses a Natural Language Processing service.

12. The system as claimed in claim 8, including a deploying component for deploying the chatbot interface to a user selected chatbot platform.

13. The system as claimed in claim 8, wherein the API is a Representational State Transfer (RESTful) API and the description document is selected from the group consisting of: OpenAPI file (Swagger file), RESTful API Modeling Language (RAML), Web Application Description Language (WADL), and Simple Object Access Protocol (SOAP) APIs described using Web Services Description Language (WSDL).

14. The system as claimed in claim 8, wherein the API is an integration flow API and the system is provided for an integration tool.

15. The system as claimed in claim 8, wherein the API is provided on-premise, cloud based, or as a hybrid implementation.

16. A computer program product for generating a chatbot interface for an application programming interface (API) that interacts with networked applications, the computer program product comprising a computer readable storage medium having program instructions embodied therewith, the program instructions executable by a processor to cause the processor to:
  receive as an input a definition document for the API that interacts with cloud-based networked applications;
  parse the definition document to identify intents and entities and obtain examples of the identified intents and entities;
  convert the definition document to a chatbot data structure including:
    extract the intents and entities and their relationship to objects and fields in the API from the definition document, wherein the objects and fields in the API include (i) API Uniform Resource Locators, (ii) names of the cloud-based networked applications the API interacts with, and (iii) request parameters for user input information;
    train the chatbot data structure with the example intents and entities to generate a conversation specification in the chatbot data structure, wherein the conversation specification is a conversation tree storing the extracted intents and entities and their relationship to the objects and fields in the API; and
generate a chatbot interface for the API.

\* \* \* \* \*